United States Patent [19]

Barnett et al.

[11] Patent Number: 4,623,046

[45] Date of Patent: Nov. 18, 1986

[54] AUTOMATIC ADJUSTER FOR DUO-SERVO INTERNAL SHOE DRUM BRAKES

[75] Inventors: John R. Barnett, Wellesbourne; Eric C. Hales, Solihull, both of United Kingdom

[73] Assignee: Automotive Products plc, Leamington Spa, England

[21] Appl. No.: 754,083

[22] Filed: Jul. 12, 1985

[30] Foreign Application Priority Data

Jul. 21, 1984 [GB] United Kingdom ............ 8418638

[51] Int. Cl.⁴ .................................... F16D 65/56
[52] U.S. Cl. ..................... 188/79.5 GT; 188/196 BA
[58] Field of Search ............... 188/79.5 P, 79.5 SC, 188/79.5 GT, 196 BA, 328, 331

[56] References Cited

U.S. PATENT DOCUMENTS

| | | | |
|---|---|---|---|
| 2,111,321 | 3/1938 | Goepfrich | 188/79.5 SC |
| 2,132,049 | 10/1938 | Schlumbrecht | 188/79.5 SC |
| 3,200,909 | 8/1965 | Swift | 188/79.5 GT |

FOREIGN PATENT DOCUMENTS

| | | | |
|---|---|---|---|
| 1202593 | 10/1965 | Fed. Rep. of Germany | 188/196 BA |
| 2722107 | 1/1979 | Fed. Rep. of Germany | 188/196 BA |
| 2727033 | 1/1979 | Fed. Rep. of Germany | 188/196 BA |
| 0907420 | 10/1962 | United Kingdom | 188/79.5 SC |
| 1459872 | 12/1976 | United Kingdom | 188/79.5 GT |

Primary Examiner—Douglas C. Butler
Assistant Examiner—Michael P. Gilday
Attorney, Agent, or Firm—Solon B. Kemon

[57] ABSTRACT

A duo-servo brake comprising a pair of arcuate brake shoes within a brake drum, automatic operating means being located between opposed shoe ends for adjusting the clearance between shoes and drum characterized by the provision of a pair of pivotable adjuster plates having pawls each pawl being engageable with a ratchet toothed adjuster wheel whereby when the shoes are moved by drag from the drum upon brake actuation the automatically operated means enables pivotable movement of one or other adjuster plate to cause its pawl to ride over a ratchet wheel tooth, springs subsequently causing the wheel to rotate a screw-threaded means to automatically adjust the clearance between one or other of the shoes and the drum.

4 Claims, 4 Drawing Figures

AUTOMATIC ADJUSTER FOR DUO-SERVO INTERNAL SHOE DRUM BRAKES

BACKGROUND OF THE INVENTION

The present invention relates to an automatic adjuster for internal shoe drum brakes with duo-servo action.

Duo-servo brakes which automatically adjust the clearance between brake shoes and a drum during the course of wear of the brake shoe surface during operation are already known.

UK Patent Specification No. 1,081,441, describes a construction in which the adjusting device comprises a housing which is movable against frictional resistance upon a back plate during brake operation, the housing carrying a screw-threaded thrust member disposed between opposed ends of the brake shoes, a single spring-loaded lever being actuable to adjust the thrust member by movement of the member, caused by drum rotation, first in one direction and then in the opposite direction and adjustment being accompanied by limited movement of the housing on the back plate. It will be appreciated that the effectiveness of this construction depends upon rotation of the drum in both directions and upon housing movement on the back plate.

UK Patent Specification No. 1459872, on the other hand, describes a construction having a support which is fixed to the back plate. A pair of co-axial screw-threaded members and nuts are slidably mounted in a common sleeve mounted in the support, the screw-threaded members engaging opposed brake shoe ends so that rotation in one direction of the nuts on their respective screw-threaded members causes an effective increase in their overall length and an adjustment to the brake shoe clearance from the associated drum. A common single lever is engageable with ratchet wheels, one for each nut, the lever being rotatable about one or other of two pivot pins, disposed at the ends of arcuate slots formed in the lever, to effect rotation of a ratchet wheel and thus cause adjustment of one or the other nut. There is a consequent movement of the pins in the arcuate slots which complicates the construction and can lead to unsatisfactory operation.

It is an object of the invention to provide a new and improved automatic adjuster of simple and robust design which operates automatically to adjust each brake shoe so as to compensate for wear which otherwise would cause excessive clearance between the shoes and the associated brake drum.

SUMMARY OF THE INVENTION

According to the invention a duo-servo brake comprises a brake drum, a stationary backplate, a pair of arcuate internal brake shoes for engagement with the drum, means between one pair of opposed ends of the brake shoes for braking actuation of the shoes, first spring means for returning the shoes to a clearance position after braking actuation, and automatic operating means located between the other pair of opposed shoe ends for adjusting the clearance between the shoes and the drum characterised by a housing secured to the backplate, a hollow shaft axially slidable relative to the housing, a pair of coaxial sleeves rotatably mounted within the hollow shaft and in abutting relationship therewith, a pair of coaxial screw-threaded adjusters mounted one in screw-threaded engagement with a corresponding internal screw-threaded portion of the sleeves with opposed ends of the adjusters in non-rotatable engagement with an end of one of said brake shoes so that the location of the brake shoes relative to the internal surface of the brake drum is controlled by the distance apart of the opposed ends of the adjusters, a pair of ratchet toothed adjuster wheels attached coaxially one to each of the sleeves, an associated pair of adjuster plates one for each wheel each pivotally mounted on the housing each plate having a pawl for engagement with the teeth on an adjuster wheel which can thereby be rotated, an adjuster pin attached to the hollow shaft and projecting radially therefrom for engagement with one or other of a pair of abutments one on each adjuster plate, second spring means for rotatably urging the adjuster plates into contact with the pin, the operation of the automatically operating adjusting means being such that movement of either of the shoes circumferentially caused by drag from the drum upon brake actuation applies an axial load to the adjusting means which is transmitted by the screw-threaded adjusters, associated sleeves and abutting hollow shaft to the other of the brake shoes, relative axial movement of the hollow shaft with respect to the housing causing the pin attached thereto to engage an abutment on one or other of the adjuster plates to effect rotation thereof, the rotation being such that a predetermined degree of brake wear will cause the pawl on the rotated adjuster plate to ride over a tooth on the associated adjuster, subsequent relief of the axial load causing the adjuster plate to return under the action of said second spring means, the return movement causing the pawl to rotate the adjuster wheel whereby the internally screw-threaded sleeve turns relative to its associated sleeve to effect an increase in the distance apart of the opposed ends of the adjusters thereby automatically adjusting the clearance between one or other of the shoes and the drum, means being provided for centralising the pair of shoes with respect to the drum.

Preferably the means for centralising the pair of brake shoes with respect to the drum comprises a recess formed transversely on the external surface of the hollow shaft, a member normally in engagement with each side of the recess and restrained from axial movement relative to the housing, third spring means for urging the member radially inwardly of the hollow shaft into said engagement, the recess being so formed that upon movement of the hollow shaft axially in either direction under load the member is moved so that it is disengaged from one side of the recess and displaced radially outwardly of the shaft against the third spring means, the third spring means applying a force to the engaged side of the recess so that when the said load is removed the member causes axial return movement of the hollow shaft to restore the member into engagement with both sides of the recess.

The recess may be of substantially conical configuration and the member may be a ball carried in the end of a spring-loaded cup whereby the ball engages the face of the conical recess

BRIEF DESCRIPTION OF THE DRAWINGS

The invention will now be described, by way of example, with reference to the accompanying drawings in which.

DESCRIPTION OF A PREFERRED EMBODIMENT

The duo-servo internal shoe drum brake shown in FIGS. 1 to 4 comprises a rotatable brake drum 1 (see FIG. 1) for attachment to a wheel, a stationary backplate 2 for attachment to the chassis or body frame of a vehicle and a pair of brake shoes 3, 4 each carrying a friction lining 5, 6 for braking engagement with the internal circumferential surface of the drum.

Figure 1:
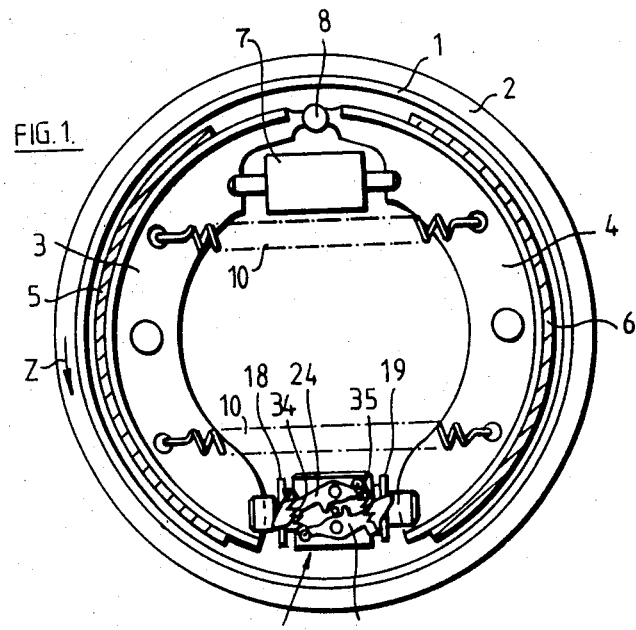
FIG. 1 is a side-elevational view of a duo-servo internal shoe drum brake assembly according to the invention.

A hydraulic piston and cylinder assembly 7 engages the brake shoes at the leading end of shoe 3 and the trailing end of shoe 4, in the sense of drum rotation indicated by the arrow "Z" in FIG. 1, in order to apply the brakes, the shoes being pivotally carried, adjacent to the cylinder assembly, by means of an anchor pin 8 secured to the backplate 2. Retraction springs 10 are attached to the shoes 3 and 4, to urge them together and clear of the drum 1. Automatic operating means 9 are located between the trailing end of shoe 3 and the leading end of shoe 4, in the sense of drum rotation indicated by arrow "Z", for transmitting the thrust between the shoes upon brake application to obtain duo-servo operation, the clearance between the drum and the friction linings on the shoes being automatically adjusted by the means 9 to ensure that the clearance does not become excessive on account of lining wear during use. The automatic action will be described in detail in conjunction with the rest of the assembly.

Figure 2:
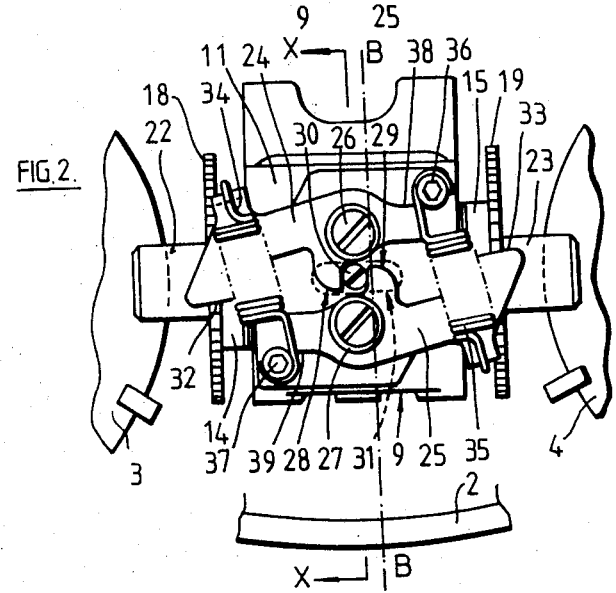
FIG. 2 is a detailed plan view of the automatic adjuster part of the brake shown in FIG. 1.
Figure 3:
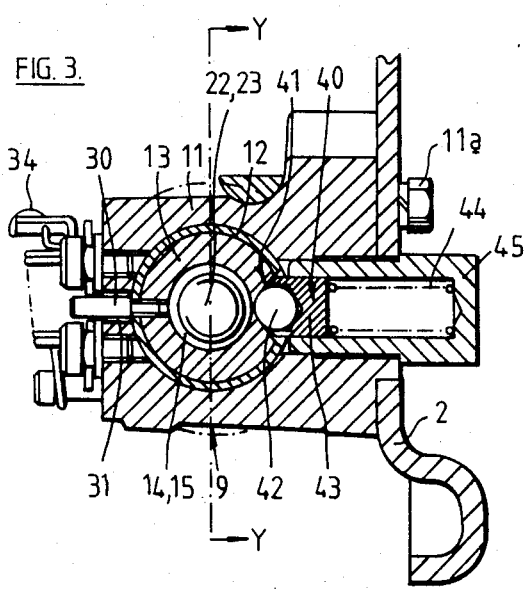
FIG. 3 is a cross-sectional end elevation of the adjuster taken along the line X—X shown in FIG. 2.
Figure 4:
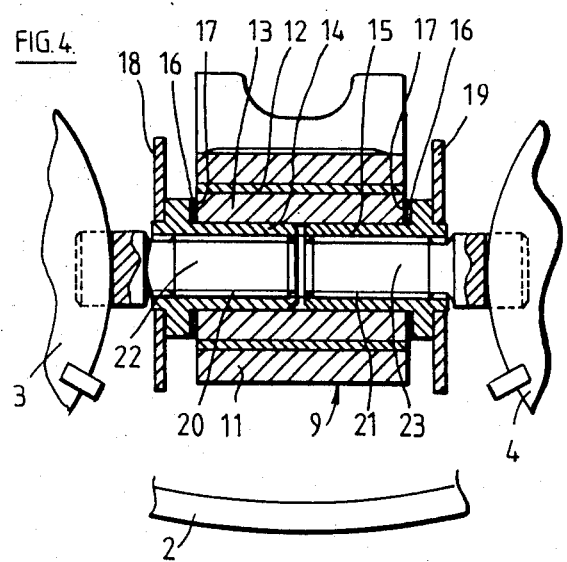
FIG. 4 is a cross-sectional view of the adjuster taken along the line Y—Y shown in FIG. 3.

The automatic operating means 9 is shown in more detail in FIGS. 2 to 4 and comprises a housing 11 rigidly secured by bolts 11a to the backplate 2. A bush 12 is secured in the housing 11 and carries a hollow shaft 13 slidable in the bush and thus axially slidable relative to the housing. A pair of co-axial sleeves 14, 15 are rotatably mounted within the hollow shaft and lie in abutting relationship therewith through the interposed pairs of washers 16, 17 one of which is of a material of relatively low frictional coefficient. An adjuster wheel 18,19 is secured one to each sleeve, the wheels being provided with peripheral ratchet teeth. The bore of each sleeve is provided with a screw-thread 20, 21 within which is carried a correspondingly screw-threaded adjuster 22, 23, one for each sleeve. The threads 20 and 21 are of opposite hand, one right-hand and the other left-hand. The adjusters each have a forked end non-rotatably engaged with an end of brake shoes 3 or 4. It will be appreciated that the location of the brake shoes relative to the internal surface of the brake drum is controlled by the distance apart of the opposed ends of the adjusters 22, 23, which distance can automatically be varied in the manner to be described in the course of this description.

A pair of adjuster plates 24, 25, one for each wheel 18, 19, are rotatably mounted on the housing 11 by means of pivots 26, 27 (see particularly FIG. 2). In the centralised position shown in FIG. 2, abutments 28, 29, formed on the adjuster plates, are in engagement with an adjuster pin 30 which projects radially from the hollow shaft 13 to which it is secured, a slot 31 being formed in housing 11 to enable axial movement of shaft and pin to take place as will be described. The bush 12 also is slotted for the same purpose.

Each adjuster plate is formed at its outer end into an integral pawl 32, 33, a spring 34, 35 for each plate performing a dual purpose, firstly to keep the pawl in engagement with the ratchet teeth by bearing upon the upper surface of the plate (FIG. 2), and, secondly, to rotatably urge the adjuster plate so that its abutment 28, 29 contacts the pin 30. The springs 34, 35 are engaged under tension with pins 36,37 and there are also provided stop faces 38, 39 one on each plate which normally engage the pins 36, 37 under pressure from the said springs. Centralising means 40 are carried by the housing 11 (see FIG. 3) and comprises a conical recess 41 formed on the external surface of the hollow shaft 13. A ball 42 is freely rotatably carried in a cup 43 and is urged into the recess 41 by means of a compression spring 44 within a cylindrical pocket 45 secured to the housing 11 by an external screw-thread. The ball 42 is, in the centralised position of the hollow shaft 13 and thus of the shoes 3 and 4, in engagement with each side of the conical recess, and it will be appreciated that axial movement of the hollow shaft causes disengagement of the ball from one side of the recess or the other and a radially outward movement of the ball relative to the shaft 13 with further compression of spring 44. A restoring and centralising force is then set up by pressure of the ball against the inclined face of the recess with which it lies in contact. It will be noted that the center line of the housing 11, shown by "X"—"X" in FIG. 2, is offset from the axis of the brake assembly "B"—"B" shown in the same figure.

The operation of the brake and automatic adjuster just described will now be explained.

Actuation of the hydraulic piston and cylinder assembly 7 when the drum 1 is rotating in the direction of arrow "Z" (see FIG. 1) expands brake shoes 3, 4 so that the linings 5, 6 frictionally engage the drum, the shoe 3 then becoming the primary shoe and being carried by the frictional drag of the drum to transmit a thrust through the means 9 to the brake shoe 4 which then constitutes the secondary shoe. The secondary shoe lining 6 by the servo-action thus set up, is urged against the drum.

Normally there is a clearance between the shoe linings and the drum sufficient to avoid undue movement of the shoes to effect brake application but, as a result of continual brake application as described, the lining is worn and there is a tendency for the clearance to become excessive and it is the operation of the means 9 according to the invention which avoids this disadvantage.

The thrust through the means 9 is carried by the screw-threaded adjuster 22 and sleeve 14 by which it is engaged, through the abutting interposed washers 16, 17 to the hollow shaft 13 causing it to slide axially (towards the right when viewed in FIGS. 2 and 4). The adjuster pin 30 attached to the shaft 13 moves with it to engage the abutment 29 on the adjuster plate 25 and rotate that plate (clockwise FIG. 2) against the tension of the spring 35. Rotation of the adjuster plate 25 moves the integral pawl 33 over the teeth of the associated adjuster wheel 19, and, if the movement is sufficient as a result of the amount of clearance taken up between the lining 6 on shoe 4 and the drum, the pawl passes over one tooth pitch. No rotation of the adjuster wheel takes place on account of the ratchet tooth form. However, upon release of the braking action, the thrust through means 9 is exhausted and the hollow shaft carrying the pin moves back axially to its initial position, the centralising means 40 acting in the way described and the spring 35 acting to rotate its associated adjuster plate 25 in an anti-clockwise direction simultaneously allowing the pawl 33 to move ratchet adjuster wheel 19 by one tooth to rotate sleeve 15 relative to its screw-threaded adjuster 23 whereby it is screwed out and the effective length of means 9 is increased to take up excessive wear and restore the amount of clearance, further wear causing subsequent automatic adjustment in the manner described. It will be noted that, advantageously, adjustment takes place when the thrust load is removed providing a more reliable action than a mechanism designed to effect adjustment while under thrust load.

It will be appreciated that drum rotation in the reverse direction automatically and independently causes adjustment of the left-hand adjuster plate 24, wheel 18, sleeve 14 and screw-threaded adjuster 22 which is screwed outwardly to increase the effective length of means 9 and restore the clearance between the lining 5 of shoe 3 and the drum.

A hole, not shown in the drawings, is formed in the backplate 2 to give access, by means of an appropriate tool, to the adjuster wheels 18 and 19 whereby they can be manually adjusted when required.

We claim:

1. A duo-servo brake comprising a brake drum, a stationary backplate, a pair of arcuate internal brake shoes for engagement with the drum, means between one pair of opposed ends of the brake shoes for braking actuation of the shoes, first spring means for returning the shoes to a clearance position after braking actuation, and automatic operating means located between the other pair of opposed shoe ends for adjusting the clearance between the shoes and the drum said automatic means including a housing secured to the backplate, a hollow shaft axially slidable relative to the housing, a pair of coaxial sleeves rotatably mounted within the hollow shaft and in abutting relationship therewith, a pair of coaxial screw-threaded adjusters each mounted in screw-threaded engagement with a corresponding internal screw-threaded portion of an associated sleeve with opposed ends of the adjusters in non-rotatable engagement with an end of one of said brake shoes so that the location of the brake shoes relative to the internal surface of the brake drum is controlled by the distance apart of the opposed ends of the adjusters, a pair of ratchet toothed adjuster wheels attached coaxially one to each of the sleeves, an associated pair of adjuster plates one for each wheel, each plate pivotally mounted on the housing, each plate having a pawl for engagement with the teeth on an associated adjuster wheel which can thereby be rotated, an adjuster pin attached to the hollow shaft and projecting radially therefrom for engagement with one or other of a pair of abutments, one abutment on each adjuster plate, second spring means for rotatably urging the adjuster plates into contact with the pin, the operation of the automatic operating adjusting means being such that movement of either of the shoes circumferentially caused by drag from the drum upon brake actuation applies an axial load to the adjusting means which is transmitted by the screw-threaded adjusters, associated sleeves and abutting hollow shaft to the other of the brake shoes, relative axial movement of the hollow shaft with respect to the housing causing the pin attached thereto to engage an abutment on one or other of the adjuster plates to effect rotation thereof, the rotation being such that a predetermined degree of brake wear will cause the pawl on the rotated adjuster plate to ride over a tooth on the associated adjuster wheel, subsequent relief of the axial load causing the adjuster plate to return under the action of said second spring means, the return movement causing the pawl to rotate the adjuster wheel whereby the internally screw-threaded sleeve turns relative to its associated screw-threaded adjuster to effect an increase in the distance apart of the opposed ends of the adjusters thereby automatically adjusting the clearance between one or other of the shoes and the drum, centering means being provided for centralizing the hollow shaft with respect to the housing upon release of the brake, said centering means including a recess formed transversely on the external surface of the hollow shaft, a member normally in engagement with each side of the recess and restrained from axial movement relative to the housing, third spring means for urging the member radially inwardly of the hollow shaft into said engagement, the recess being so formed that upon movement of the hollow shaft axially in either direction under load the member is moved so that it is disengaged from one side of the recess and displaced radially outwardly of the shaft against the third spring means, the third spring means applying a force to the engaged side of the recess so that when the said load is removed the member causes axial return movement of the hollow shaft to restore the member into engagement with both sides of the recess.

2. A duo-servo brake according to claim 1 wherein the recess is of substantially conical configuration and the member is a ball carried in the end of a spring-loaded cup whereby the ball engages the sides of the conical recess.

3. A duo-servo brake according to claim 1 wherein there is provided between each of the co-axial sleeves and the hollow shaft a spacing washer through which the abutting relationship therebetween is maintained.

4. A duo-servo brake according to claim 3 wherein a second washer is provided abutting the first one for each sleeve, the second washer being of relatively low-friction material.

* * * * *